United States Patent [19]

Fairbairn et al.

[11] Patent Number: 4,740,965
[45] Date of Patent: Apr. 26, 1988

[54] ASYNCHRONOUS COMMUNICATIONS NETWORK

[75] Inventors: Ian A. Fairbairn, Maidenhead; John L. Ryan, Chalfont St. Peter, both of England

[73] Assignee: EMI Limited, Hayes, England

[21] Appl. No.: 802,453

[22] Filed: Nov. 27, 1985

[30] Foreign Application Priority Data

Nov. 29, 1984 [GB] United Kingdom ................. 8430167

[51] Int. Cl.$^4$ ............................ H04J 3/12; H04L 7/04
[52] U.S. Cl. .................................... 370/110.1; 375/111
[58] Field of Search ............... 370/85, 86, 110.1, 100; 371/42, 46; 340/825.5; 375/111, 117, 106

[56] References Cited

U.S. PATENT DOCUMENTS 4,208,650 6/1980 Horn .................................... 375/117
4,581,734 4/1986 Olson et al. ............................ 370/85
4,581,735 4/1986 Flamm et al. ......................... 370/85

Primary Examiner—Douglas W. Olms
Assistant Examiner—Frank M. Scutch, III
Attorney, Agent, or Firm—Fleit, Jacobson, Cohn & Price

[57] ABSTRACT

A Local Area Network consists of a number of stations connected together by a transmission line, each station having a transmitter and a receiver. A transmitter generates a sequence of information signals having individual message portions separated from one another by flag signals, each message portion having a predetermined number of symbols. A receiver processes a message portion by analyzing the content of each section formed by dividing the message portion into the predetermined number of equal parts. The receiver includes stores and, a detector, a signal-divider and a unit which determines a representative value.

6 Claims, 1 Drawing Sheet

ASYNCHRONOUS COMMUNICATIONS NETWORK

FIELD OF THE INVENTION

The present invention relates to a data communications network and particularly, but not exclusively, to a network having a number of transmitters and a number of receivers all linked together by a common transmission line.

DESCRIPTION OF RELATED ART

Existing data communications networks require the synchronising of the receiver clock to the transmitter clock in order for the received signals to be processed correctly.

An object of the present invention is to provide a data communications network requiring no synchronization of the receiver clock to the transmitter clock.

SUMMARY OF THE INVENTION

The present invention provides a data communications network comprising:
at least one transmitter and at least one receiver linked together by a common transmission line;
the at least one transmitter having means to generate a data signal which comprises a stream of digital symbols arranged into serial message portions, each said message portion being defined within the stream by at least one flag signal which is constituted by a predetermined digital pattern, each of the message portions having a constant predetermined number of symbols;
the at least one receiver having means to receive a stream of data signals of the form generated by the transmitter, means to locate the message portions in the stream as received, means to effect division of any message portion determined by said location means into equal divisions, the number of said divisions in a message portion corresponding to the number of symbols of information in a message portion as transmitted, and means to determine a representative symbol-value appropriate to each division of a message portion.

In this way, the received signal is processed such that each message portion is considered to be divided into a number of parts corresponding to the predetermined number of symbols within a message portion of the signal before transmission. By doing this, the information-content of each message portion is effectively unaltered by the transmission, regardless of whether or not there is any change in the time interval taken to arrive at the receiver. Thus the relative clock frequencies of the transmitter and receiver are of no consequence.

Preferably, the receiver has means to sample the received data stream at a rate being a multiple of the nominal rate at which signals are transmitted within the network, and means to store the value of each sample. In this way, the location of the flags can readily be determined, and the length of each message portion reaching a receiver can be calculated.

Preferably, the value-determining means effects, in use, a weighting to emphasise the significance of information centrally located within a division.

The receiver may have means to detect any discrepancy between the standard amount of information in a symbol upon transmission and the numbers of samples within a specific division, and means to effect an adjustment to the samples within a division in accordance with any discrepancy detected.

The value of a symbol appropriate to a division can be determined in any one of a number of appropriate ways; the network can have provision to select between different ways as required. In one form, the value-determining means includes means to calculate the average value of information throughout a divided part of a message portion (with or without weighting). Alternatively, the value-determining means includes means to take the value of the sample centrally located within a division.

BRIEF DESCRIPTION OF THE DRAWING

In order that the invention may more readily be understood, a description is now given, by way of example only, reference being made to the accompanying drawings in which.

DESCRIPTION OF THE PREFERRED EMBODIMENT

Figure 1:
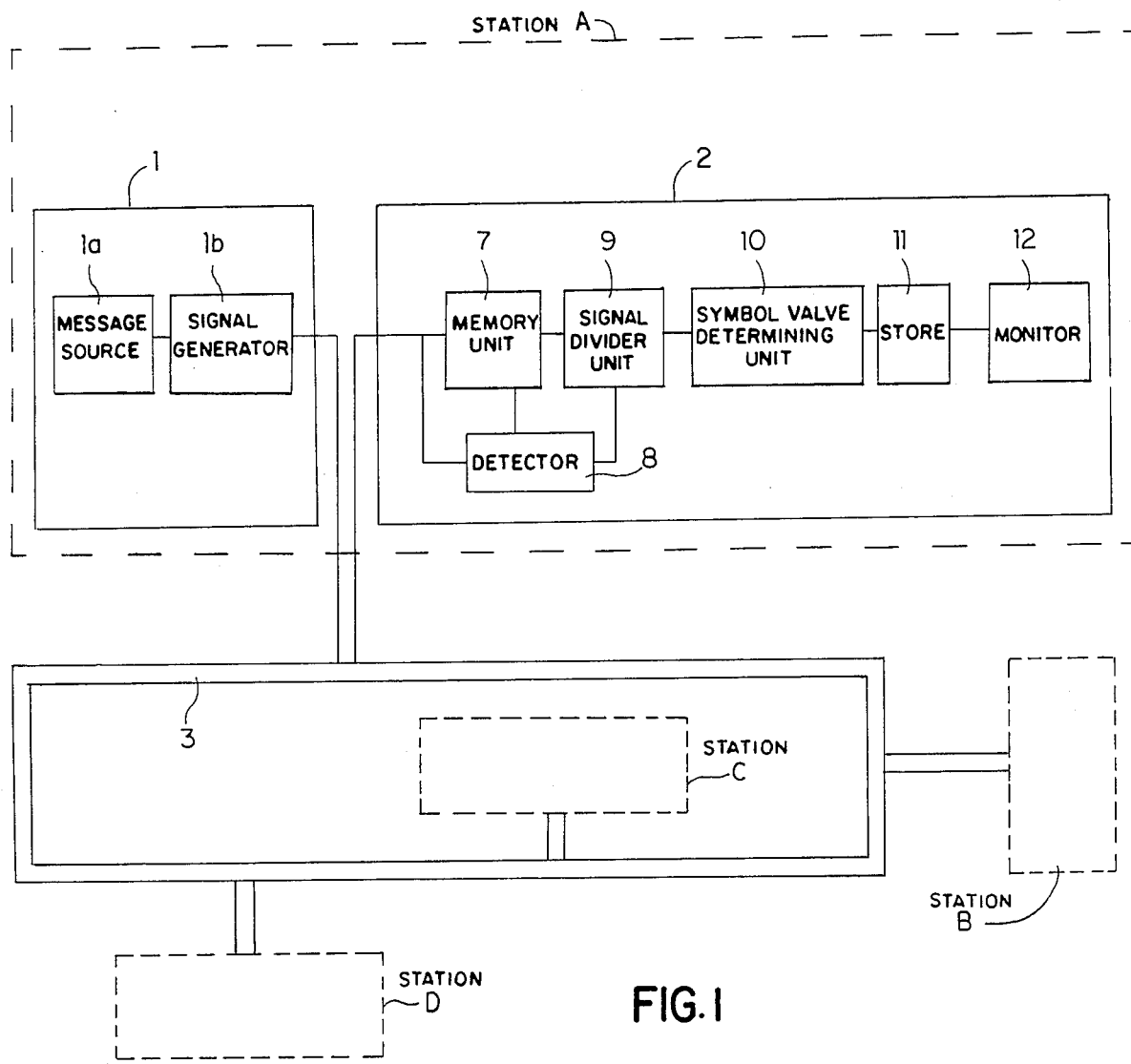
FIG. 1 is a block diagram of a data communication network embodying the present invention.

The local area network (or LAN) shown partly in FIG. 1 consists of a number of stations A, B, C, D each having a transmitter 1 and a receiver 2, the stations connected to one another by a common copper-wire transmission line 3 which enables the transfer of communication signals between the stations.

Figure 2:
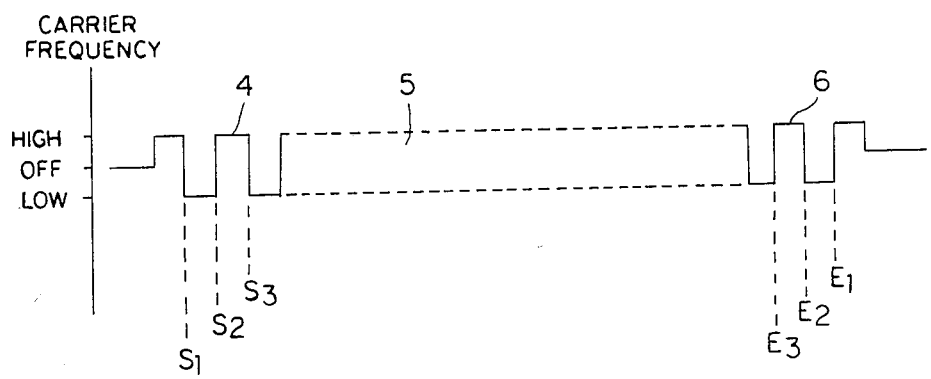
FIG. 2 is a schematic diagram of the form of a signal for transmission in the network of FIG. 1.

Each transmitter 1 has a message source or compiler 1a and a signal generator 1b, so that the transmitter is capable of generating a sequence of information signals consisting of a number of individual message portions separated from one another by flag signals. One suitable form of message portion and accompanying flag signals is shown in FIG. 2; this consists of a start-flag 4 of four pulses alternating in high and low frequencies, then a message portion 5 of 98 symbols each consisting of digital information, concluded by an end-flag 6 of four pulses alternating in low and high frequencies.

One particular advantage of this form of signal is that, in the start-flag 4, the transitions representing edges $S_1$ and $S_2$ can be used to optimise measurement of the transition representing edge $S_3$, this being the reference transition before message portion 5. Likewise, in the end-flag 6, the transitions representing edges $E_1$ and $E_2$ can be used to optimise measurement of the transition representing edge $E_3$; clearly this processing cannot be done in "real time" but requires storage of the signal as edge $E_3$ precedes $E_1$ and $E_2$.

After the end-flag 6 there is a section with no carrier (i.e. effectively the transmitter is switched off), so that this absence of carrier further aids the receiver in identifying the signal. Each message portion 5 is formed of a predetermined number N of symbols of information, all the symbols being of equal length.

Any signals input to receiver 2 are passed to a RAM memory unit 7 for storage. Before input to memory unit 7, they are sampled by a detector 8 at a frequency ten times that of the nominal clock frequency K of the network (i.e. corresponding to the nominal transmission rate of the signals) in order to identify the start-flags 4 and end-flags 6 within the sequence of signals. Having done this, detector 8 is able to locate the message portions 5 within the sequence of signals, and to determine the length, as received, of each message portion 5 in relation to the nominal clock frequency K.

Using the results of these calculations, detector 8 applies sets of command pulses to the memory unit 7 and to a signal-divider unit 9 in such a manner that each portion 5, in the signals output from memory unit 7, is divided into N parts of equal length. This sequence of divided signals is then passed to a unit 10 which determines a value, or a series of values, representing the symbol appropriate to each division of the message portions 5.

Unit 10 can operate in any one of a number of appropriate ways. For example, it may inspect all the information samples within a recovered symbol and then determine which value is in the majority; alternatively, it may inspect only some of the information samples and determine which value, amongst those bits chosen, is in the majority; alternatively, it may take the value of the central sample within a symbol.

As the values representing the symbols of the message portions 5 are output from unit 10, they are passed to a RAM store 11 for subsequent display on monitor 12 or for other processing as required.

In order to further explain operation of the illustrated network, a particular example will now be described, in which the receiver clock frequency is 10% higher than the transmitter clock frequency. The receiver must recognise this and compensate accordingly, otherwise false readings will start at about the fifth group in the received packet.

As already mentioned, the input to the receiver is sampled at ten times the receiver clock frequency and the resulting samples are stored in order in suitable bit-addressed memory 7. Approximately 1170 memory bit locations will be filled before the carrier disappears, signalling the end of that packet. The first samples stored in memory are examined in turn and the address of the first zero sample is noted. Similarly the addresses of other changed samples corresponding to synchronising edges are found and used to improve the accuracy of location of the second one/zero transition which is then used as the effective start of the message. In practice, the location of $S_1$ etc. would not be based on the first sample transition only: instead, a decision as to the probable edge location would be based on several readings in the vicinity of the edge.

Similarly, samples are examined working back from the end of the block of samples to determine the address of the end flag's zero/one transition which is nearest the message (E3 in FIG. 2). This marks the effective end of the message. The two addresses thus identified enclose the message plus a symbol from each of the two flags, making a total of 100 symbols.

Dedicated hardware within detector 8 calculates the difference between the two addresses. In this case the difference will be about 1100. This number is divided by 100 (the number of symbols in a message portion) to determine the actual number of samples taken per symbol by the receiver.

Starting from an address equal to the address of the first transition plus the number of samples corresponding to one and one half symbols (in this case 1.5 * 11 16) the centre of each symbols can be read at sample bit addresses separated by 11 samples.

If the samples per symbol had not been a whole number, a single sample adjustment of the address would be necessary periodically; apart from this the procedure would be similar to that described above.

In order to extract maximum information from the stored message in this case, the value of a symbol would be taken as that of the majority of, say, 5 of the central samples of the symbol.

Even though the example described above utilises FSK modulation, clearly the present invention is equally relevant to base-band or other modulation systems. Also, the invention can be used with binary, tertiary or any other appropriate form of signal.

We claim:

1. A data communications network comprising:
   at least one transmitter and at least one receiver linked together by a common transmission line;
   the at least one transmitter having means to generate a data signal which comprises a stream of digital symbols arranged into serial message portions, each said message portion being defined within the stream by at least one flag signal which is constituted by a predetermined digital pattern, each of the message portions having a constant predetermined number of symbols;
   the at least one receiver having means to receive a stream of data signals of the form generated by the transmitter, means to sample the received stream at a rate being a multiple of the nominal rate at which signals are transmitted within the network, means to store the sample, means to locate the message portions in the stream as received, means to effect division of any message portion determined by said location means into equal divisions, the number of said divisions in a message portion corresponds to the number of symbols of information in a message portion as transmitted, and means to determine a representative symbol-value appropriate to each division of a message portion.

2. A data communications network according to claim 1, wherein the value determining means effects, in use, a weighting to emphasise the significance of information centrally located within a division.

3. A data communications network according to claim 1, wherein the receiver has means to detect any discrepancy between the standard amount of information in a message portion upon transmission and the content of a division produced by the division means, and means to effect an adjustment to a division in accordance with any discrepancy detected.

4. A signal receiver for use in a data communication network, the receiver comprising:
   means to receive a data signal which comprises a stream of digital symbols arranged into serial message portions, each said message portion being defined within the stream by at least one flag signal which is constituted by a predetermined digital pattern;
   means to sample the received stream at a rate being a multiple of the nominal rate at which signals are transmitted within a data communications network with which it operates,
   means to store the value of each sample;
   means to locate the message portions in the stream as received,
   means to effect division of any message portion determined by said location means into equal divisions, the number of said divisions in a message portion corresponding to the number of symbols of information in a message portion as transmitted in the network; and means to determine a representative symbol-value appropriate to each division of the message portion.

5. A signal receiver according to claim 4, wherein the value-determining means effects, in use, a weighting to emphasise the significance of information centrally located within a division.

6. A signal receiver according to claim 4, having means to detect any discrepancy between the standard amount of information in a message portion upon transmission and the content of a division produced by the division means, and means to effect an adjustment to a division in accordance with any discrepancy detected.

* * * * *